(12) United States Patent
Hara

(10) Patent No.: US 7,950,224 B2
(45) Date of Patent: May 31, 2011

(54) METHOD FOR CONTROLLING EXHAUST GAS PURIFICATION SYSTEM

(75) Inventor: Shinji Hara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 566 days.

(21) Appl. No.: 12/085,571

(22) PCT Filed: Nov. 21, 2006

(86) PCT No.: PCT/JP2006/323140
§ 371 (c)(1),
(2), (4) Date: May 28, 2008

(87) PCT Pub. No.: WO2007/066502
PCT Pub. Date: Jun. 14, 2007

(65) Prior Publication Data
US 2009/0165442 A1 Jul. 2, 2009

(30) Foreign Application Priority Data
Dec. 8, 2005 (JP) ................................ 2005-354891

(51) Int. Cl.
*F01N 3/00* (2006.01)
(52) U.S. Cl. ................ 60/286; 60/274; 60/295; 60/297; 60/301
(58) Field of Classification Search .................... 60/274, 60/286, 295, 297, 301, 303, 311
See application file for complete search history.

(56) References Cited

U.S. PATENT DOCUMENTS

| | | | | |
|---|---|---|---|---|
| 7,207,171 B2* | 4/2007 | Nagaoka et al. | ................ | 60/295 |
| 7,229,597 B2* | 6/2007 | Patchett et al. | ................ | 422/177 |
| 7,340,884 B2* | 3/2008 | Matsuno et al. | ................ | 60/295 |
| 7,412,822 B2* | 8/2008 | Zhan et al. | ................ | 60/295 |

(Continued)

FOREIGN PATENT DOCUMENTS

JP 4-87332 7/1992

(Continued)

OTHER PUBLICATIONS

Supplementary Partial European Search Report dated Jan. 8, 2010 in corresponding European patent application No. 06832990.

(Continued)

*Primary Examiner* — Binh Q. Tran
(74) *Attorney, Agent, or Firm* — Staas & Halsey LLP

(57) ABSTRACT

An exhaust gas purification system (1) comprises a DPF device (13) and a selective catalytic reduction type catalytic device (SCR catalytic device) (14) provided, in that order, from the upstream side of an exhaust passage (12) of an internal combustion engine (11). During ordinary operation, a NOx emission amount is calculated from a NOx emission map for ordinary operation, while during forced regeneration of the DPF device (13), a NOx emission amount is calculated from a NOx emission map for forced regeneration. A supply amount of aqueous ammonia solution (S) corresponding to the calculated NOx emission amount is then calculated. The aqueous ammonia solution (S) is then supplied into an exhaust gas (G) at the upstream side of the selective catalytic reduction type catalytic device (14) such that the amount supplied is brought to the calculated supply amount. As a result of this configuration, appropriate amounts of reducing agent can be supplied not only during ordinary operation but also during the forced regeneration of the DPF device (13), and the emission of NOx and ammonia downstream to the selective catalytic reduction type catalytic device (14) can be suppressed.

4 Claims, 9 Drawing Sheets

U.S. PATENT DOCUMENTS 7,614,218 B2 * 11/2009 Akagawa .................. 60/295
2003/0140621 A1 7/2003 Khair et al.

FOREIGN PATENT DOCUMENTS

| | | |
|---|---|---|
| JP | 2000-282843 | 10/2000 |
| JP | 2002-227688 | 8/2002 |
| JP | 2002-250220 | 9/2002 |
| JP | 2004-218475 | 8/2004 |
| JP | 2004-316658 | 11/2004 |
| WO | 00/34632 | 6/2000 |

OTHER PUBLICATIONS

International Search Report for international application PCT/JP2006/323140, mailed on Feb. 20, 2007.

Patent Abstract of Japan, publication No. 2000-282843, publication date Oct. 10, 2000.

Chinese Office Action issued on Aug. 21, 2009 in corresponding Chinese Patent Application 2006800413332.

* cited by examiner

METHOD FOR CONTROLLING EXHAUST GAS PURIFICATION SYSTEM

CROSS-REFERENCE TO RELATED APPLICATIONS

This application claims the benefit under 35 U.S.C. Section 371, of PCT International Application Number PCT/JP2006/323140, filed on Nov. 21, 2006 and Japanese Application No. 2005-354891, filed on Dec. 8, 2005 in Japan, the contents of which are incorporated herein by reference.

BACKGROUND OF THE INVENTION

1. Field of the Invention

The present invention relates to a method for controlling an exhaust gas purification system having a diesel particulate filter device and a selective catalytic reduction type catalytic device provided, in that order, from the upstream side of the exhaust passage of an internal combustion engine such as a diesel engine.

2. Description of the Related Art

In order to reduce particulate matter (PM) and NOx (nitrogen oxides) exhausted from internal combustion engines such as diesel engines, some exhaust gas purification systems are provided with a diesel particulate filter device (DPF device) and a NOx reduction catalytic device (SCR catalytic device) that supports a selective catalytic reduction type catalyst (referred to as an SCR catalyst).

As an example of such exhaust gas purification systems, exhaust gas purification devices for diesel engines have been proposed as described in Japanese Patent Application Kokai Publication No. 2002-250220 (Patent Document 1), for example, wherein, with the aim of improving the NOx removal rate as well as preventing ammonia slip, a NOx catalyst (SCR catalytic device) is disposed posterior to a particulate matter reducing device (DPF device) in an exhaust system, the ratio $NO/NO_2$ is calculated based on the temperature at the outlet of the particulate matter reducing device, and an amount of urea supplied to the NOx catalyst is controlled based on this calculated value.

In addition, exhaust gas treatment systems have been proposed as described in Japanese Patent Application Kokai Publication No. 2004-218475 (Patent Document 2), for example, wherein a DPF device, a selective catalytic reduction type catalyst (SCR catalytic device), and a NOx storage reduction catalyst are provided from the upstream side of the exhaust passage of an internal combustion engine. The exhaust gas is purified by the removal of NOx thereof by the selective catalytic reduction type catalyst at high temperatures and by the NOx storage reduction catalyst at low temperatures, and thus the system removes NOx from exhaust gas over a wide range of engine operation and at a high NOx removal rate.

In addition, exhaust gas treatment devices have been proposed as described in Japanese Patent Application Kokai Publication No. 2004-353523, for example, wherein favorable NOx removal effects are obtained for the entire operational range of the engine by circulating and mixing ammonia with exhaust gas, the ammonia being formed by vaporizing aqueous urea solution using the heat of the exhaust gas and the heat from a heater. The mixture is then introduced into a denitration catalytic reactor and NOx is removed.

In these devices and systems, the supplied amount of aqueous urea solution is adjusted and controlled based on factors such as: the NOx emission amount obtained from a NOx emission map that is based on the engine speed and torque; NOx concentration measured by a NOx sensor at the downstream side of the DPF device and the NOx amount present in exhaust gas calculated from the exhaust amount; and all or part of the output of an exhaust gas temperature, exhaust gas flow amount, and nitrogen oxides sensor.

However, in this exhaust gas purification system provided with a DPF device and a SCR catalytic device, it is necessary to conduct a forced DPF regeneration control to remove deposited PM by combustion for clogging of the DPF device due to PM deposits. In this forced DPF regeneration control it is typical to use techniques such as halting EGR or releasing air intake throttling in order to promote PM combustion.

During ordinary operation, NOx emission is suppressed by EGR. However, in the forced DPF regeneration control, EGR is halted in order to increase oxygen concentration and promote combustion of PM (soot) deposited on the DPF. Halting EGR promotes the formation of $NO_2$ (nitrogen dioxide) to promote reactions between $NO_2$ and PM, which more readily react in a low-temperature zone compared to $O_2$ (oxygen) and PM, and thus the promoted reactions provide the effect of efficiently conducting DPF regeneration and reducing the PM originating from the engine.

In this forced DPF regeneration control, the engine operating state becomes different from the ordinary, and a large amount of NOx is exhausted, this amount being different from the NOx emission amount calculated from the NOx emission map set in advance for ordinary operation. For example, bench test results of actual engines showed that the NOx emission amount during forced DPF regeneration was measured nearly double that of ordinary operation.

Consequently, there is a problem in that during the forced DPF regeneration control, in the case where an injection amount (supply amount) of aqueous urea solution is calculated and injected on the basis of NOx emission amounts estimated for the ordinary operational state, there is the possibility that the system will not be able to sufficiently reduce NOx exhausted from the engine, the NOx removal rate during forced DPF regeneration will greatly decrease, and NOx exceeding the emission level during ordinary operation will be exhausted to the downstream side of the SCR catalytic device.

Moreover, in the opposite case where an injection amount of aqueous urea solution is uniformly calculated and injected on the basis of a map based on NOx weights estimated for the forced DPF regeneration, there is the problem in that during ordinary operation, there arises the possibility that unconsumed surplus ammonia will be exhausted to the downstream side of the SCR catalytic device, and thus the amount of ammonia slip will increase.

Patent Document 1: Japanese Patent Application Kokai Publication No. 2002-250220
Patent Document 2: Japanese patent application Kokai publication No. 2004-218475
Patent Document 3: Japanese patent application Kokai publication No. 2004-353523

DISCLOSURE OF THE INVENTION

Problem to be Solved by the Invention

It is an object of the invention to provide a method for controlling an exhaust gas purification system wherein a DPF device and a selective catalytic reduction type catalytic device (SCR catalytic device) are disposed, in that order, from the upstream side of the exhaust passage of an internal combustion engine, and wherein the system is able to supply an appropriate amount of reducing agent for not only ordinary operation, but also forced regeneration of the DPF device, thereby suppressing the emission of NOx and ammonia to the downstream side of the selective catalytic reduction type catalytic device.

Means for Solving the Problem

The method for controlling an exhaust gas purification system of the present invention for achieving the above-described object is provided with a diesel particulate filter device for removing particulate matter in an exhaust gas and a selective catalytic reduction type catalytic device for removing NOx in the exhaust gas, those two devices being disposed in that order from the upstream side in the exhaust gas passage of an internal combustion engine. The system is also provided with an aqueous solution supply device that supplies an aqueous ammonia solution to the selective catalytic reduction type catalytic device, the supply device being disposed at the downstream side of the diesel particulate filter device and upstream side of the selective catalytic reduction type catalytic device. In addition, the system is provided with aqueous supply amount adjusting means for adjusting the aqueous ammonia solution supply amount. The method for controlling this system has the following characteristics.

In the method for controlling the above exhaust gas purification system, NOx emission amounts during ordinary operation and NOx emission amounts during forced regeneration of the diesel particulate filter device are measured in advance. On the basis of these measured results, a NOx emission map for ordinary operation and a NOx emission map for forced regeneration of the diesel particulate filter device are prepared. In addition, during ordinary operation, NOx emission amounts are calculated from the NOx emission map for ordinary operation, a supply amount of aqueous ammonia solution corresponding to the calculated NOx emission amount is calculated, and then the aqueous ammonia solution is supplied to bring the supplied amount to the calculated supply amount. During forced regeneration of the diesel particulate filter device, NOx emission amounts are calculated from the NOx emission map for forced regeneration, a supply amount of aqueous ammonia solution corresponding to the calculated NOx emission amount is calculated, and then the aqueous ammonia solution is supplied to bring the supplied amount to the calculated supply amount.

The aqueous ammonia solution herein refers to aqueous solutions for forming urea solution, ammonia, ammonia solution, etc. In addition, the NOx emission map refers to not only mappings of NOx emission amounts, but also mappings of values directly involved in the calculation of NOx emission amounts, such as NOx concentration. Ordinarily, data on NOx emission amounts or NOx concentration are mapped based on parameters that indicate the operational state of the engine, i.e., the engine speed and the engine load (or alternatively, torque, fuel flow amount, the accelerator opening, etc.). This mapped data is stored in a control device of the exhaust gas purification system.

Also, in this control method, a NOx emission map for forced regeneration is prepared in advance in addition to a NOx emission map for ordinary operation. According to system conditions, a NOx emission map is selected and used from among both the NOx emission maps for ordinary operation and for forced regeneration.

During ordinary operation, the NOx emission map for ordinary operation is used to calculate NOx emission amounts. However, during forced regeneration of the DPF, the NOx emission map for forced regeneration is used to calculate NOx emission amounts. Based on these calculated results, injection amounts (supply amounts) of aqueous ammonia solution are calculated. Aqueous ammonia solution is then injected (supplied) on the basis of these calculated results.

In so doing, even during forced regeneration of the DPF device wherein a larger amount of NOx is discharged than during ordinary operation, an injection amount of aqueous ammonia solution corresponding to this large NOx emission amount can be injected, and thus sufficient NOx reduction performance can be secured.

Consequently, by using this control method, the following problems are resolved. First, there is the problem that NOx sensors themselves are not mass-produced for use in diesel engines, and their reliability with regard to durability is insufficient. Second, there is the problem that soot is burned during DPF regeneration, new NOx is formed depending on the temperature conditions, and thus the NOx inflowing to the selective catalytic reduction type catalytic device cannot be accurately calculated, even when the NOx discharged from the engine is measured with a NOx sensor. Thirdly, there is the problem that when measuring using a NOx sensor, only the total amount of NOx is known, whereas the proportion of $NO_2$ or NO, for example, are unknown. Moreover, during forced DPF regeneration a portion of the $NO_2$ discharged from the engine reacts with the soot and becomes NO, and thus it is not possible to configure an injection amount of urea solution that takes into account the proportions of $NO_2$ and NO in the NOx.

Alternatively, in the above method for controlling an exhaust gas purification system, NOx emission amounts during ordinary operation are measured in advance, and a NOx emission map for ordinary operation is prepared on the basis of these measured results. Additionally, during ordinary operation NOx emission amounts are calculated from the NOx emission map for ordinary operation, and supply amounts of aqueous ammonia solution corresponding to the calculated NOx emission amounts are calculated. The aqueous ammonia solution is then supplied to bring the supplied amount to the calculated supply amount. During forced regeneration of the diesel particulate filter device, the NOx emission amounts are calculated according to the NOx concentration and the exhaust gas emission amount measured by a NOx concentration sensor provided at the upstream side of the selective catalytic reduction type catalytic device. Supply amounts of aqueous ammonia solution corresponding to the calculated NOx emission amounts are then calculated, and the aqueous ammonia solution is then supplied to bring the supplied amount to the calculated supply amount.

With this control method, a map method using a NOx emission map for ordinary operation is used during ordinary operation, while the NOx concentration detected by a NOx concentration sensor provided at the upstream side of the selective catalytic reduction catalytic device is used instead of a map method during forced DPF regeneration.

In so doing, it becomes unnecessary to prepare a NOx emission map for forced DPF regeneration, which requires long-duration experiments (since PM deposits are necessary therefor). For this reason, an engine can be adapted for this invention with the additional installation of a NOx concentration sensor and a partial modification of the control program, even for engines that are only provided with a NOx emission map for ordinary operation. Not only that, NOx emission amounts during forced DPF regeneration can be calculated more accurately.

Alternatively, in the above method for controlling an exhaust gas purification system, NOx emission amounts during ordinary operation are measured in advance, and a NOx emission map for ordinary operation is prepared on the basis of these measured results. Additionally, during ordinary operation NOx emission amounts are calculated from the NOx emission map for ordinary operation, and supply amounts of aqueous ammonia solution corresponding to the calculated NOx emission amounts are calculated. The aqueous ammonia solution is then supplied to bring the supplied amount to the calculated supply amount. During forced regeneration of the diesel particulate filter device, the aqueous ammonia solution is supplied such that the NOx concentration measured by a NOx concentration sensor provided at the downstream side of the selective catalytic reduction type catalytic device becomes less than or equal to a predetermined first setting value.

With this control method, a map method using a NOx emission map for ordinary operation is used during ordinary operation, while the NOx concentration detected by a NOx concentration sensor provided at the downstream side of the selective catalytic reduction catalytic device is used instead of a map method during forced DPF regeneration. Also, aqueous ammonia solution is supplied such that this downstream NOx concentration becomes equal to or less than a predetermined first setting value, and preferably such that the downstream NOx concentration becomes equal to the first setting value.

In other words, even if the NOx emission amount increases during forced DPF regeneration, aqueous ammonia solution is supplied such that the downstream NOx concentration whose value is dependent on this NOx emission amount becomes equal to or less than a predetermined first setting value, and preferably such that the downstream NOx concentration becomes equal to the first setting value, thereby suppressing the amount of NOx outflowing to the downstream side of the selective catalytic reduction catalytic device. This supply control can be easily conducted using a feedback control or similar means.

In so doing, although the long-duration experiments (since PM deposits are necessary) for the preparation of a NOx emission map during forced DPF regeneration become necessary, the preparation of the map itself becomes unnecessary. For this reason, an engine can be adapted for this invention with the additional installation of a NOx concentration sensor and a partial modification of the control program, even for engines that are only provided with a NOx emission map for ordinary operation. Not only that, the amount of NOx outflowing to the downstream side of the selective catalytic reduction catalytic device (i.e., NOx slip) can be more accurately suppressed.

Alternatively, in the above method for controlling an exhaust gas purification system, NOx emission amounts during ordinary operation are measured in advance, and a NOx emission map for ordinary operation is prepared on the basis of these measured results. Additionally, during ordinary operation NOx emission amounts are calculated from the NOx emission map for ordinary operation, and supply amounts of aqueous ammonia solution corresponding to the calculated NOx emission amounts are calculated. The aqueous ammonia solution is then supplied to bring the supplied amount to the calculated supply amount. During forced regeneration of the diesel particulate filter device, the aqueous ammonia solution is supplied such that the ammonia concentration measured by an ammonia sensor provided at the downstream side of the selective catalytic reduction catalytic device becomes greater than or equal to a predetermined second setting value and additionally less than or equal to a predetermined third setting value.

With this control method, a map method using a NOx emission map for ordinary operation is used during ordinary operation, while the ammonia concentration detected by an ammonia concentration sensor provided at the downstream side of the selective catalytic reduction catalytic device is used instead of a map method during forced DPF regeneration. Also, aqueous ammonia solution is supplied such that this downstream ammonia concentration becomes greater than or equal to a predetermined second setting value and additionally less than or equal to a predetermined third setting value.

In other words, even if the NOx emission amount increases during forced DPF regeneration, aqueous ammonia solution is supplied such that the downstream ammonia concentration, whose value is dependent on the ammonia emission amount at the downstream side of the selective catalytic reduction catalytic device, becomes greater than or equal to a predetermined second setting value and additionally less than or equal to a predetermined third setting value. By making this ammonia concentration be greater than or equal to a predetermined second setting value, it is confirmed that an amount of aqueous ammonia solution sufficient for NOx reduction is being supplied, thereby suppressing the amount of NOx outflowing to the downstream side of the selective catalytic reduction catalytic device. Moreover, by supplying aqueous ammonia solution such that the ammonia concentration becomes larger than a predetermined second setting value and less than or equal to a predetermined third setting value, the amount of ammonia outflowing to the downstream side of the selective catalytic reduction catalytic device is suppressed.

In other words, since reducing agent can be supplied while confirming that the supplied amount of reducing agent is sufficient, NOx slip can be more accurately suppressed. This supply control can be easily conducted by a feedback control or similar means.

In so doing, although the long-duration experiments (since PM deposits are necessary) for the preparation of a NOx emission map during forced DPF regeneration become necessary, the preparation of the map itself becomes unnecessary. For this reason, an engine can be adapted for this invention with the additional installation of an ammonia concentration sensor and a partial modification of the control program, even for engines that are only provided with a NOx emission map for ordinary operation. Not only that, amounts of aqueous ammonia solution sufficient for the reduction of NOx during forced DPF regeneration can be more accurately supplied.

According to each of the control methods described above, aqueous ammonia solution can be injected in injection amounts corresponding to the NOx emission amounts, even in the case where a larger amount of NOx is discharged during forced DPF regeneration than during ordinary operation, and substantial practical NOx reduction performance can be secured.

In addition, any one of the following, or combinations thereof, may be adopted as the above DPF device: a filter-only DPF device, a continuous regeneration type DPF device supporting an oxidation catalyst on the filter, a continuous regeneration type DPF device provided with an oxidation catalyst at the upstream side of the filter, or a continuous regeneration type DPF device supporting a catalyst on the filter and provided with an oxidation catalyst at the upstream side of the filter.

Advantages of the Invention

According to the method for controlling an exhaust gas purification system of the present invention, an exhaust gas purification system is provided with a DPF device and a selective catalytic reduction type catalytic device (SCR catalytic device) disposed, in that order, from the upstream side of the exhaust passage of an internal combustion engine. During forced regeneration of the DPF device, even if an amount of discharged NOx is greater than during ordinary operation, an amount of aqueous ammonia solution corresponding to the NOx amount can be injected, and thereby substantial NOx reduction performance can be secured. Consequently, decreases in the NOx removal performance of the selective catalytic reduction type catalytic device during forced regeneration of the DPF device can be suppressed.

MODES FOR CARRYING OUT THE INVENTION

Hereinafter, embodiments of the method for controlling an exhaust gas purification system in accordance with the present invention will be described with reference to the accompanying drawings.

Figure 1:
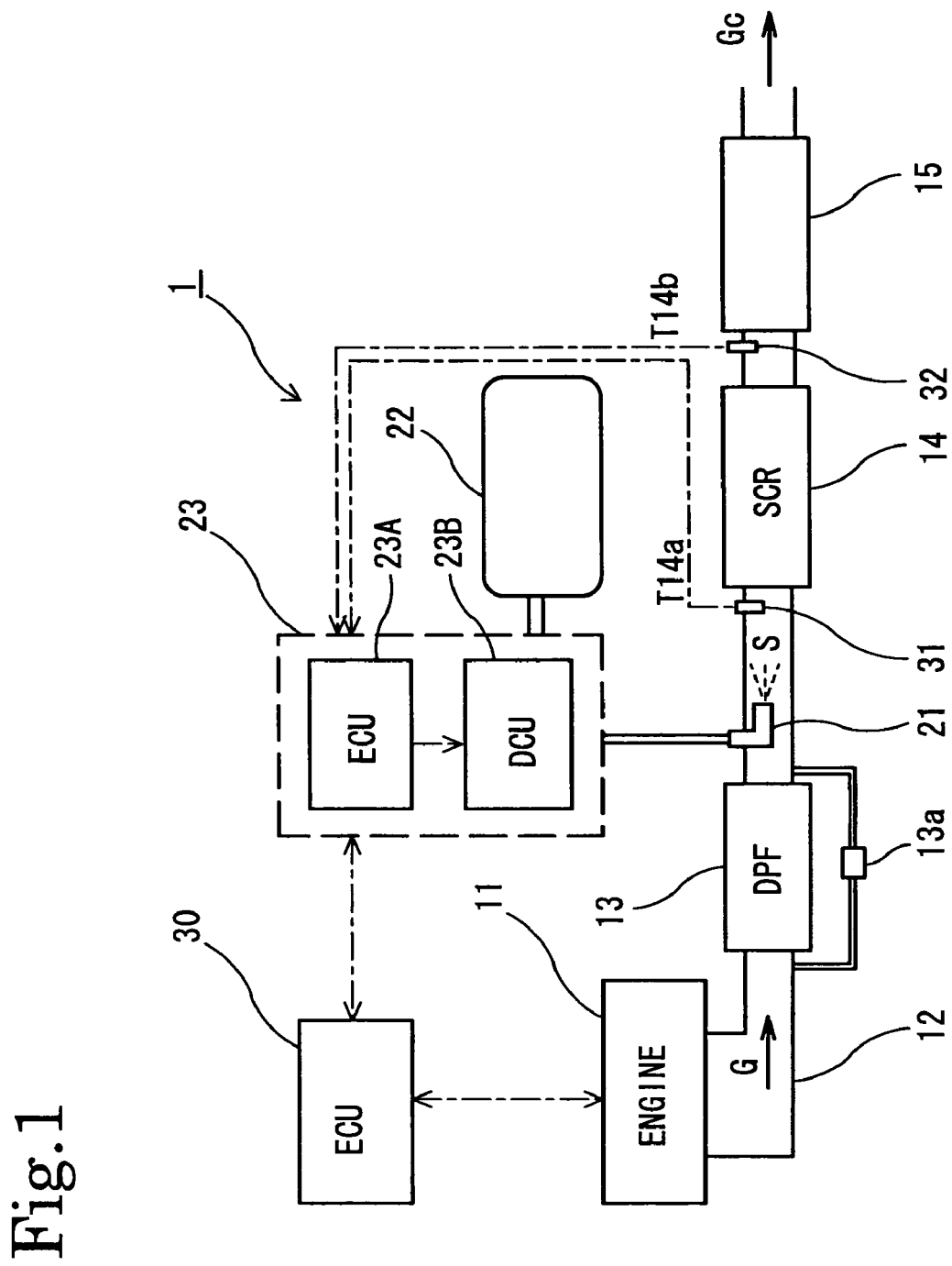
FIG. 1 is a system configuration diagram of the exhaust gas purification system in accordance with the first embodiment of the present invention.

FIG. 1 shows the configuration of an exhaust gas purification system 1 for carrying out the method for controlling an exhaust gas purification system of the first embodiment. This exhaust gas purification system 1 includes a diesel particulate filter device (hereinafter, DPF device) 13, a selective catalytic reduction catalytic device (hereinafter, SCR catalytic device) 14, and an oxidation catalyst device 15 provided, in that order, from the upstream side in an exhaust passage 12 of an engine (diesel internal combustion engine) 11.

In this exhaust gas purification system 1, PM (particulate matter) in the exhaust gas is collected (trapped) through the upstream DPF device 13. This DPF device 13 is formed as a monolith honeycomb wall-flow type filter or similar filter, wherein the entrances and exits of porous ceramic honeycomb channels thereof are blocked in an alternating pattern. In a wall-flow type filter, PM in the exhaust gas is trapped at the porous ceramic walls. In order to promote PM combustion, a catalyst such as platinum or cerium oxide may be supported on a portion of this filter. In addition, in order to estimate the amount of deposited PM in this DPF device 13, differential pressure sensors 13a are provided in conducting pipes connected before and after the DPF device 13.

The SCR catalytic device 14 is formed as a carrier with a honeycomb structure (i.e., a catalytic structure) supporting a substance such as titania/vanadium, zeolite, chromium oxide, manganese oxide, molybdenum oxide, titanium oxide, or tungsten oxide. This carrier is formed from a material such as cordierite, aluminum oxide, or titanium oxide.

Upstream to this SCR catalytic device 14, a urea solution injection valve 21 is provided as an aqueous solution supply device of the exhaust passage 12 at the downstream side of the DPF device 13. Furthermore, an inlet exhaust gas temperature sensor 31 is provided at the inlet aperture of the SCR catalytic device 14, and an outlet exhaust gas temperature sensor 32 is provided at the outlet aperture thereof.

In an abundant oxygen environment in this SCR catalytic device 14, an aqueous ammonia solution S of urea solution, ammonia, or ammonia solution is injected into the exhaust passage 12, thereby supplying ammonia formed from the aqueous ammonia solution to the SCR catalytic device 14. By selectively contacting and reacting the ammonia with NOx in the exhaust gas G, the NOx is reduced to nitrogen and removed.

Among aqueous ammonia solutions, in this embodiment the highly safe urea solution is used as the NOx reducing agent. This urea solution S is supplied to the exhaust gas from a urea solution injection valve 21. The urea in this urea solution S decomposes to ammonia by hydrolysis. Using this ammonia, NOx in the exhaust gas is reduced to nitrogen by the catalytic action of the SCR catalyst. This urea solution S is supplied from a urea solution tank 22. By using a urea solution injection control unit 23, which acts as the means for adjusting the aqueous solution supply amount, adjustment of the supply amount of the urea solution S and injection of the urea solution S into the exhaust passage 12 are conducted.

The oxidation catalyst device 15 is formed supporting an oxidation catalyst such as platinum on a carrier of porous ceramic honeycomb or similar structure. When the supply amount of urea solution S becomes greater than that consumed in the SCR catalytic device 14, the oxidation catalyst device 15 performs the function of oxidizing unconsumed ammonia outflowing from the SCR catalytic device 14 and largely reducing the amount of ammonia released into the atmosphere. In so doing, the release of ammonia into the atmosphere (ammonia slip) is suppressed. The exhaust gas G is purified by the exhaust gas purification system 1, and purified exhaust gas Gc is released into the atmosphere.

Next, control of the exhaust gas purification system 1 having the above configuration will be described. This exhaust gas purification system 1 is provided with a control device 30 for controlling the operation of the engine 11 (i.e., an engine control unit: ECU) and a urea solution injection control unit 23.

The control device 30 is provided with DPF regeneration control means for controlling the regeneration control of the DPF device 13. In ordinary operation control, PM is trapped through the DPF device 13. During this ordinary operation control, the state of blockage of the DPF device 13 is monitored via the pre- and post-DPF differential pressure detected by the differential pressure sensor 13a to determine whether it is time for regeneration. If it is determined that it is time for regeneration, the forced DPF regeneration control is conducted. In addition, if it is determined that it is time for regeneration, a control signal for the forced regeneration control of the DPF device 13 is sent from the control device 30 to the urea solution injection control unit 23.

In the forced DPF regeneration control, techniques such as increasing the exhaust temperature of the engine 11 via in-cylinder injection control such as post injections, halting EGR, and releasing air intake throttling are typically conducted. Using these controls, oxygen concentration is increased to promote PM combustion in the DPF device 13, a reactions between $NO_2$ (nitrogen dioxide) and PM are promoted by the formation of $NO_2$ (nitrogen dioxide), which reacts with PM at comparatively low temperatures more easily than $O_2$ (oxygen) reacts with PM, and the formation of PM from the engine 11 is reduced, thereby efficiently recovering the DPF device 13. Subsequently, after the forced DPF regeneration control, ordinary operation is again resumed. The vehicle is thus operated while repeating this ordinary operation and the forced regeneration control of the DPF device 13.

Additionally, a urea solution injection control unit (urea solution injection control means) 23 is provided. This urea solution injection control unit 23 includes a supply amount adjustment device (aqueous solution supply amount adjustment means: ECU [Electric Control Unit]) 23A for calculating and adjusting a supply amount Qt of the urea solution S, and an injection valve control device (injection valve control means: DCU) 23B for injecting the urea solution by controlling the urea solution injection valve 21.

This urea solution injection control unit 23 inputs data on engine operational conditions from the control device 30 (e.g., the engine speed and fuel flow amount) as well as the control signal for forced regeneration control of the DPF device 13, calculates a urea solution supply amount Qt, and conducts urea solution injection.

NOx emission amounts during ordinary operation and NOx emission amounts during forced regeneration of the DPF device 13 are measured in advance for the calculation of the urea solution injection amount. On the basis of these measurements, a NOx emission map for ordinary operation and a NOx emission map for forced regeneration of the DPF device 13 are prepared. These maps are stored in the supply amount adjustment device 23A.

During ordinary operation, a NOx emission amount is calculated from the NOx emission map for ordinary operation. A supply amount of urea solution S corresponding to the calculated NOx emission amount is then calculated. The urea solution S is then supplied to bring the supplied amount to the calculated urea solution supply amount.

In addition, during forced regeneration of the DPF device 13, upon receiving from the engine 11a control signal for forced regeneration control of the DPF device 13, a NOx emission amount is calculated from the NOx emission map for forced regeneration in accordance with the control signal. A supply amount of urea solution S corresponding to the calculated NOx emission amount is then calculated. The urea solution S is then supplied to bring the supplied amount to the calculated urea solution supply amount.

Figure 2:
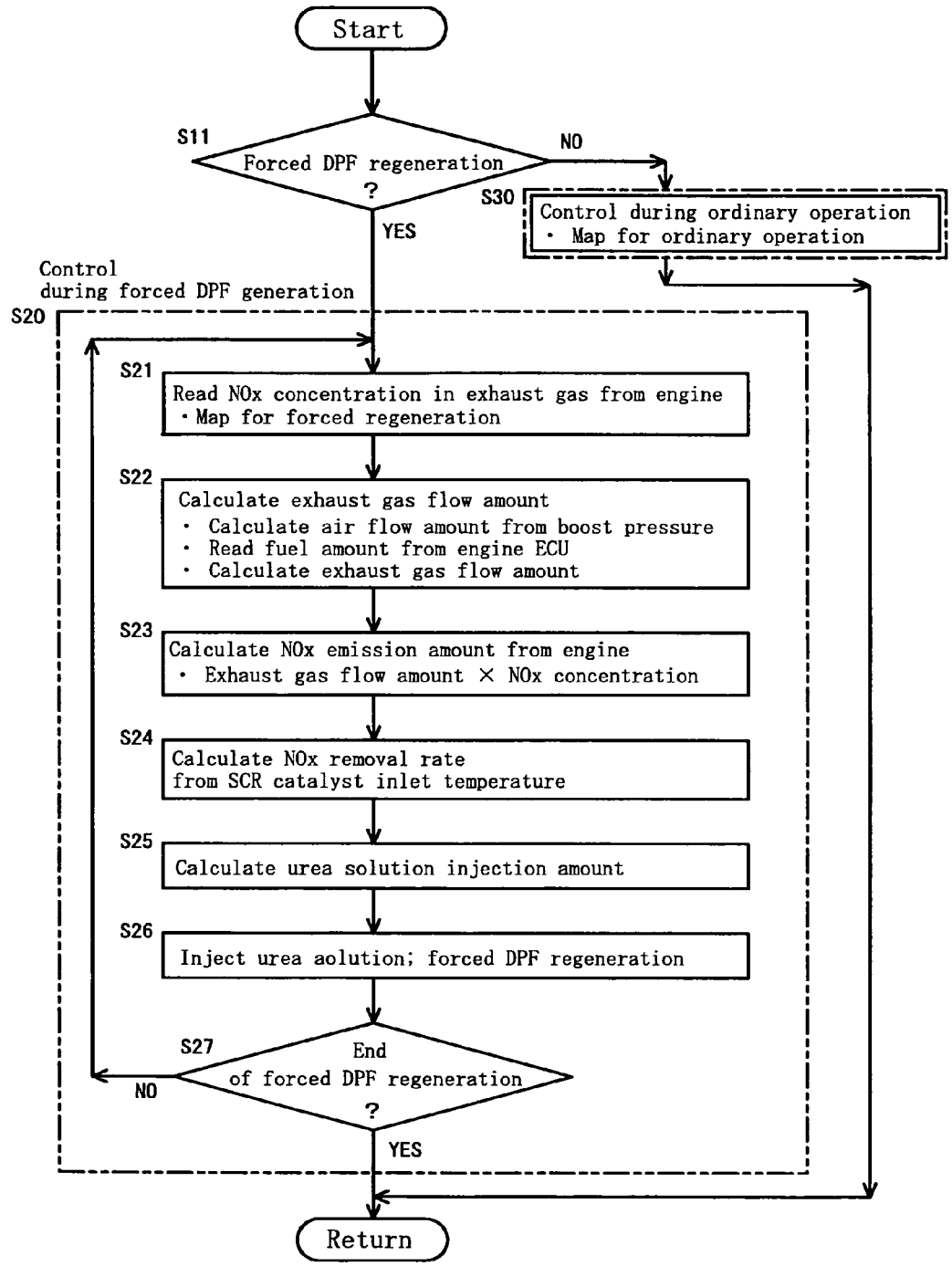
FIG. 2 is a control flowchart illustrating the method for controlling the exhaust gas purification system in accordance with the first embodiment of the present invention.

This control can be conducted with the control following the control flowchart shown in FIG. 2. The control flow in FIG. 2 is illustrated as being repeatedly called from a high-level control flow that controls the main engine, etc., then started, executed, and returned before again reverting to the high-level control flow.

When the control flow in FIG. 2 is called from the high-level control flow and started, it is determined in step S11 whether the DPF device 13 is in forced regeneration. If the DPF device 13 is in forced regeneration, the process proceeds to the control during forced DPF regeneration in step S20. If the DPF device 13 is not in forced regeneration, the process proceeds to the control during ordinary operation in step S30. The DPF device 13 is determined to be in forced regeneration if a control signal for forced regeneration control of the DPF device 13 is received from the control device 30 of the engine 11. In other words, the process proceeds to the control during forced DPF regeneration in step S20 in accordance with this control signal. Moreover, the control device 30 of the engine 11 outputs a control signal for forced regeneration control to commence forced regeneration in the case where, for example, the differential pressure detected by the differential pressure sensors 13a of the DPF device 13 becomes equal to or greater than a predetermined differential pressure value for commencing regeneration.

In the control during forced regeneration of the DPF in step S20, a first step S21 involves reading out a value Cnox of the NOx concentration in the exhaust gas discharged from the engine, the value being read from a map for forced regeneration based on the engine speed Ne and the engine load Ac. The map is prepared on the basis of detected engine conditions, i.e., the engine speed Ne and a load (torque, fuel flow amount) Ac.

More specifically, the NOx concentration Cnox is calculated from an engine speed Ne and an engine load Ac, which indicate engine operational conditions, by referring to a NOx concentration map for forced regeneration wherein NOx concentrations Cnox have been mapped based on values of the engine speed Ne and the engine load Ac. It should be appreciated that the state of the accelerator opening Acc may also be used instead of the engine load Ac.

In the subsequent step S22, an air flow amount Wa is calculated from the boost pressure Pb, and then an exhaust gas flow amount is calculated, the exhaust gas being formed as a result of the combustion of this air flow amount Wa and the fuel of a fuel flow amount Wf read from the control device 30 of the engine 11 (engine ECU).

This air flow amount Wa is calculated from the boost pressure Pb and the engine speed Ne by referring to an air flow amount map wherein values of the air flow amount Wa have been mapped based on values of the boost pressure Pb and the engine speed Ne. In addition, the fuel flow amount Wf is calculated in the control device 30 of the engine 11. The fuel flow amount Wf is calculated from the engine speed Ne and the engine load Ac, which indicate engine operational conditions, by referring to a fuel flow amount map wherein values of the fuel flow amount Wf have been mapped based on values of the engine speed Ne and the engine load Ac. It should be appreciated that the state of the accelerator opening Acc may also be used instead of the engine load Ac. The exhaust gas amount (weight) Wg is computed as the sum of the air flow amount (intake air amount: weight) Wa and the fuel flow amount (weight) Wf. This exhaust gas amount Wg is divided by the exhaust gas density ρg to calculate the exhaust gas flow amount (volume) Va.

In step S23, the exhaust gas flow amount (volume) Va calculated in step S22 is multiplied by the NOx concentration Cnox read in step S21 to compute the NOx emission amount (weight) Won discharged from the engine 11.

In the control flow in FIG. 2, values of NOx concentration Cnox are used as the NOx emission map. However, it should be appreciated that by using the NOx emission amount (weight) Won as the NOx emission map, a value for the NOx emission amount (weight) Won can be calculated directly in step S21 instead of steps S21 to S23. In this case, however, it is necessary to include changes in the exhaust gas flow amount (volume) Va in the NOx emission amount (weight) map.

In step S24, a NOx removal rate ηnox in the SCR catalytic device 14 is calculated from the exhaust gas temperature T14a at the inlet aperture of the SCR catalytic device 14 (i.e., the SCR catalyst inlet temperature). In this calculation, the catalyst temperature Tc of the SCR catalytic device 14 is estimated from the SCR catalyst inlet temperature T14a. The NOx removal rate ηnox is calculated by referring to a NOx removal rate map prepared from the catalyst temperature Tc and the amount of ammonia accumulated in the catalyst. This NOx removal rate map is a mapping of values of the NOx removal rate ηnox based on values of the catalyst temperature Tc and the amount of ammonia Wcnh3 accumulated in the SCR catalytic device 14. It should be appreciated that the NOx removal rate ηnox can be estimated more accurately by estimating using the SCR catalyst inlet temperature T14a and the SCR catalyst outlet temperature T14b, for example by calculating a mean temperature T14m (=(T14a+T14b)/2).

In step S25, the NOx emission amount (weight) Won calculated in step S23 is multiplied by the NOx removal rate ηnox calculated in step S24 to calculate the treatable NOx amount Wan. The amount of urea solution needed to reduce this treatable NOx amount Wan, i.e., the injection amount Qs of urea solution S, is then calculated. The injection amount Qs of urea solution S corresponds to amount of urea that can be consumed in the SCR catalytic device 14.

Since the injection amount Qs of urea solution S is increased to more than that in the case where engine control is conducted during ordinary operation, it is possible to significantly lessen the larger amount of NOx discharged due to forced regeneration of the DPF device 13 versus ordinary operation.

In step S26, injection of the urea solution S according to the injection amount Qs of urea solution S calculated in step S25 is conducted for a predetermined amount of time (an amount of time related to the interval of the determination of the ending of forced DPF regeneration in step S27). In parallel with the injection of the urea solution S, forced regeneration of the DPF device 13 is conducted by the control device 30 of the engine.

In this forced regeneration control of the DPF device 13, post injections injected into the cylinders of the engine 11, or alternatively, multistage delay injections and post injections are conducted along with halting EGR, exhaust throttling, and intake throttling or other techniques.

In the subsequent step S27, it is determined whether forced DPF regeneration has ended. Forced regeneration of the DPF device 13 is determined to have ended if a control signal for ending forced regeneration of the DPF device 13 is received from the control device 30 of the engine 11. In other words, the process is returned according to this control signal. Moreover, the control device 30 of the engine 11 outputs a control signal for ending forced regeneration control in the case where, for example, the differential pressure detected by the differential pressure sensors 13a of the DPF device 13 becomes equal to or less than a predetermined differential pressure value for ending regeneration.

If forced DPF regeneration has not ended, the process returns to step S21, the steps S21 to S26 are repeated and urea solution S is injected. This is repeated until it is determined in step S27 that forced DPF regeneration has ended. In addition, if forced DPF regeneration has ended, the control during forced DPF regeneration in step S20 is ended, and the process is returned.

Figure 3:
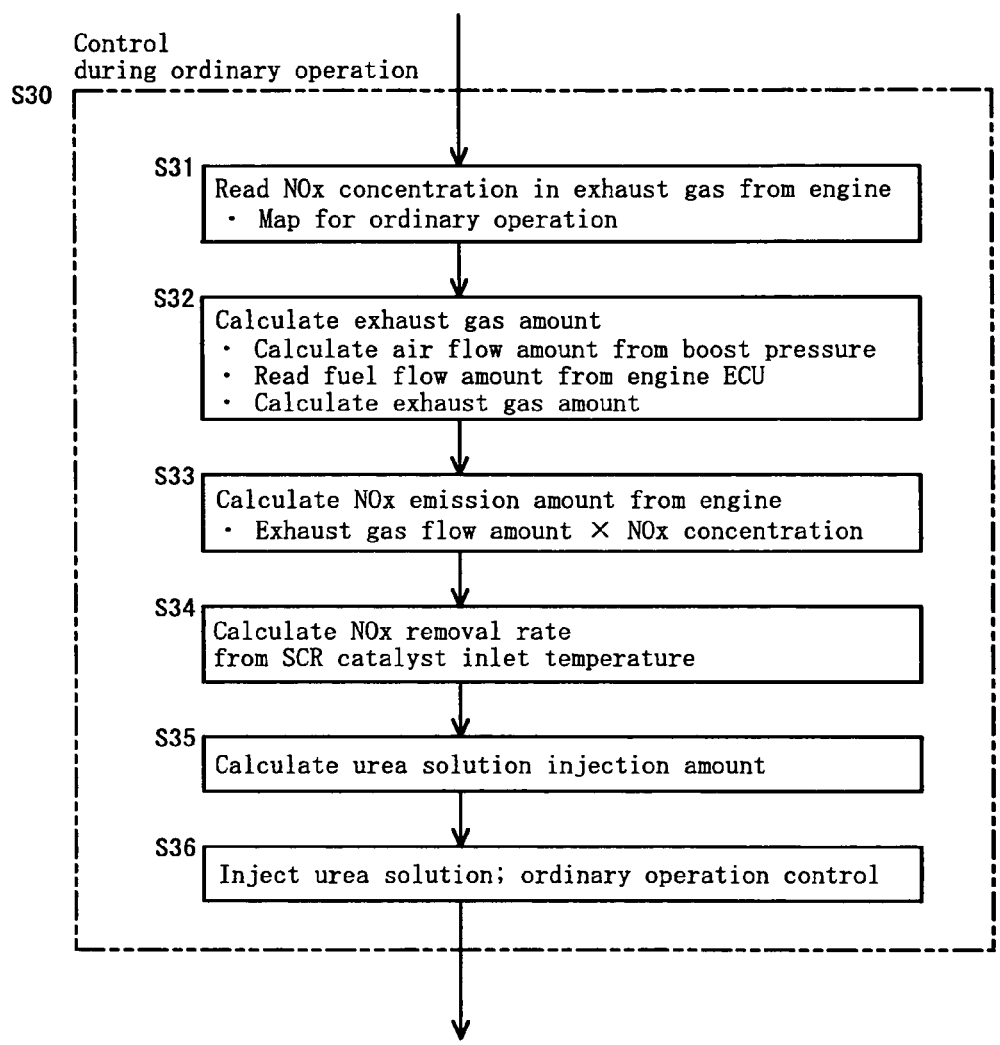
FIG. 3 is a control flowchart of the control during ordinary operation.

Meanwhile, in the control for ordinary operation in step S30, the following is conducted, as shown in FIG. 3. Step S31, similarly to step S21, involves reading out a value Cnox of the NOx concentration in the exhaust gas discharged from the engine, the value being read from a map for ordinary operation based on the engine speed Ne and the engine load (torque, fuel flow amount) Ac. The map is prepared on the basis of detected engine conditions, i.e., the engine speed Ne and the load Ac. Also, in steps S32 to S35 an injection amount Qs of urea solution S is calculated similarly to steps S22 to S25. In step S36, injection of the urea solution S according to the injection amount Qs of urea solution S is conducted for a predetermined amount of time (an amount of time related to the interval of the determination for forced DPF regeneration in step S11), and the process is returned.

The control for ordinary operation in step S30 differs from the control for forced DPF regeneration in step S20 in that in step S30, a map for ordinary operation is used, the operational control conducted during injection of the urea solution S is ordinary operational control, and there is no determination of whether forced DPF control has ended.

The following is achieved by the above control method. A NOx emission amount (weight) Won is calculated from a NOx emission map for ordinary operation. An injection amount Qs of urea solution S needed to reduce the removable NOx emission amount Wan from among the NOx emission amount Won (i.e., an injection amount Qs of urea solution S corresponding to this calculated NOx emission amount Won) is then calculated. The urea solution S is then injected to bring the injected amount to the calculated injection amount Qs of urea solution S. During forced regeneration of the DPF device 13, upon receiving a control signal for forced regeneration control of the DPF device 13 from the control device of the internal combustion engine, a NOx emission amount Won is calculated from a NOx emission map for forced regeneration according to this control signal. An injection amount Qs of urea solution S needed to reduce the removable NOx amount Wan from among the NOx emission amount Won (i.e., an injection amount Qs of urea solution S corresponding to this calculated NOx emission amount Won) is then calculated. The urea solution S is then injected to bring the injected amount to the calculated injection amount Qs of urea solution S.

In so doing, the urea solution S can be injected in an injection amount Qs corresponding to the large NOx emission amount Won, even in the case where a larger amount of NOx is discharged during forced DPF regeneration than during ordinary operation, and thus substantial NOx reduction performance can be secured.

Figure 4:
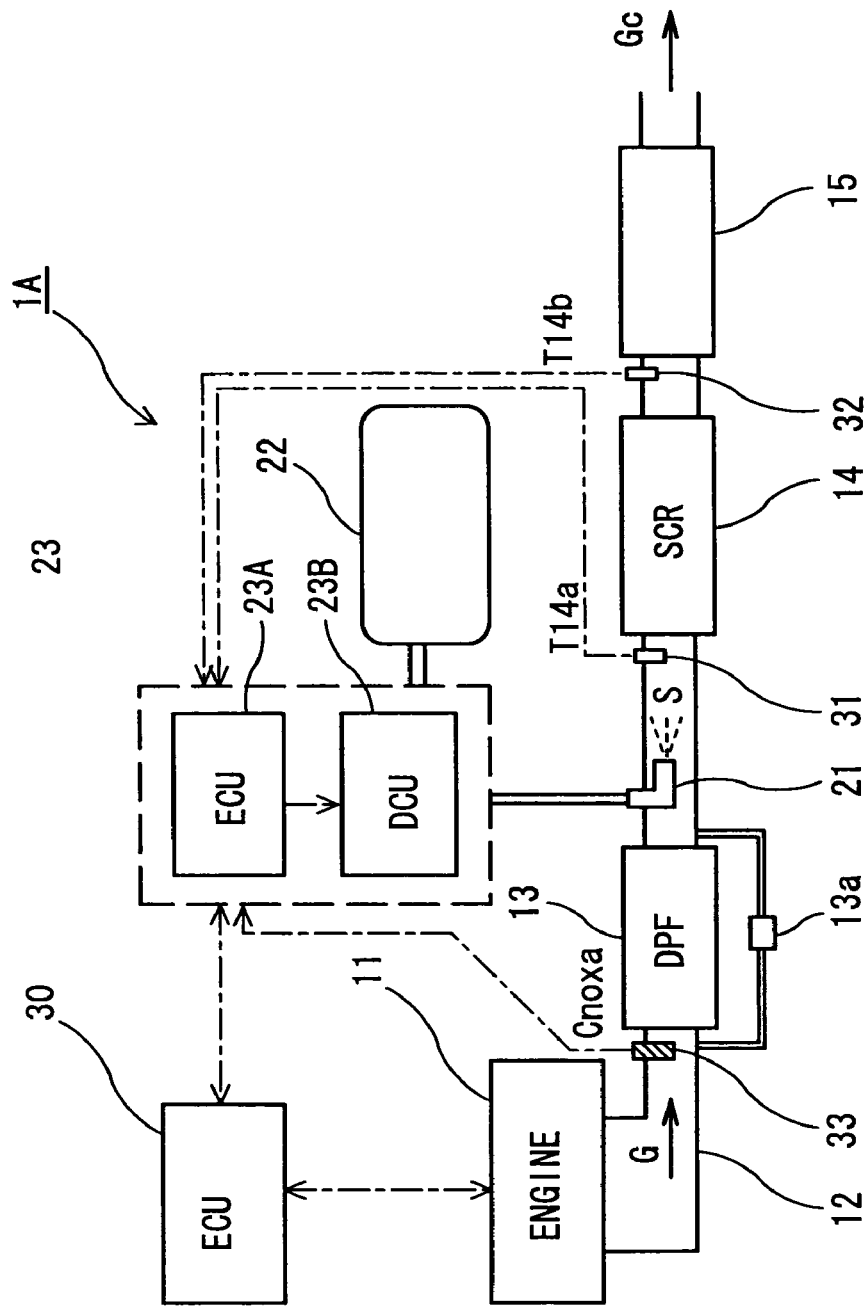
FIG. 4 is a system configuration diagram of the exhaust gas purification system in accordance with the second embodiment of the present invention.

A method for controlling an exhaust gas purification system in accordance with the second embodiment will now be described. FIG. 4 shows the configuration of an exhaust gas purification system 1A for carrying out this control method. This exhaust gas purification system 1A differs from the exhaust gas purification system 1 of the first embodiment in the following points: an upstream NOx concentration sensor 33 is installed in the exhaust passage 12 at the upstream side of the DPF device 13; the NOx concentration Cnoxa detected by this upstream NOx concentration sensor 33 is input into the urea solution injection control unit 23; and a NOx emission map for forced DPF regeneration is not necessary. Other aspects of the system configuration are identical.

Figure 5:
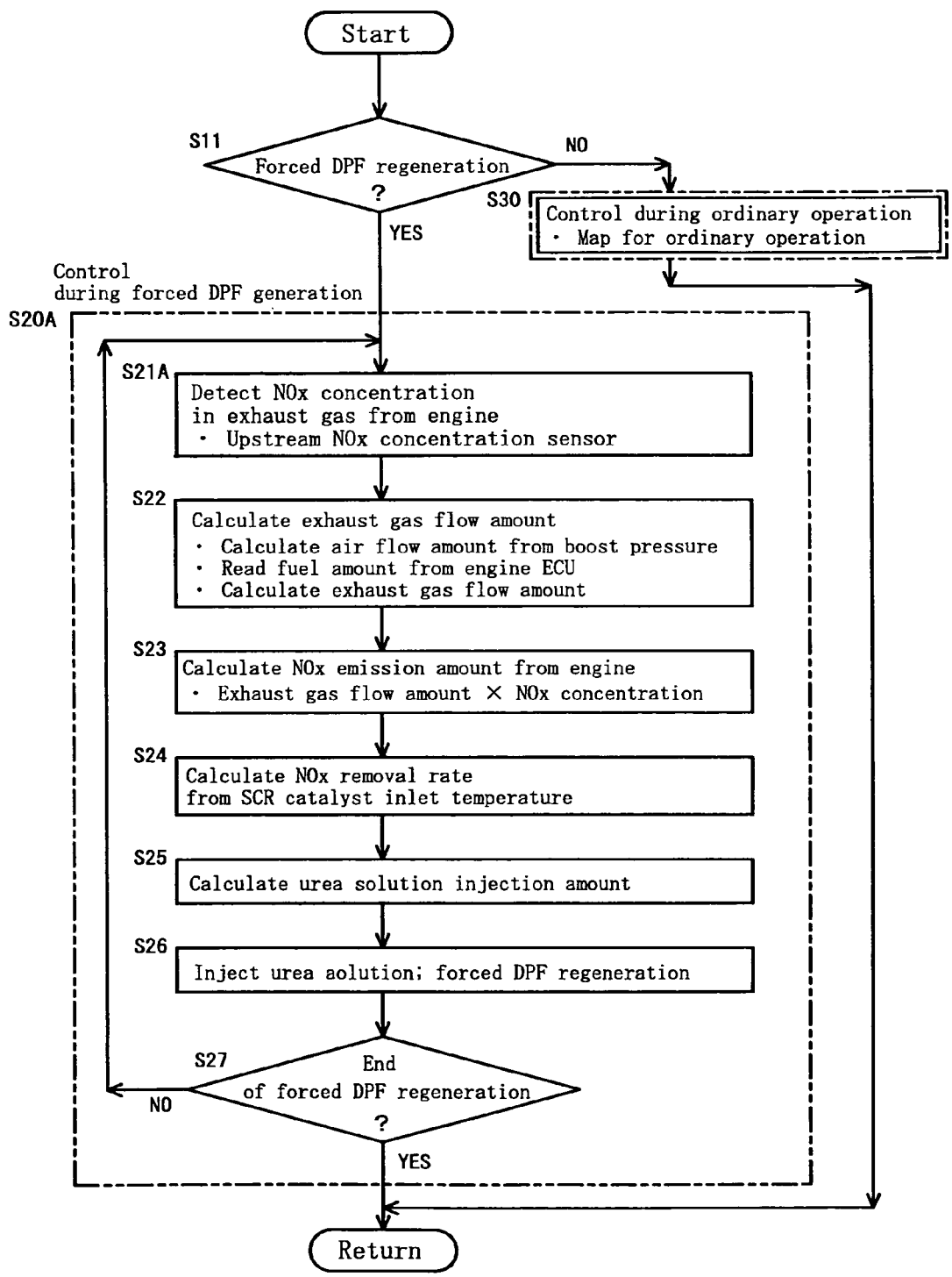
FIG. 5 is a control flowchart illustrating the method for controlling the exhaust gas purification system in accordance with the second embodiment of the present invention.

FIG. 5 is a control flowchart for the method for controlling an exhaust gas purification system of the second embodiment. This control flow differs from the control flowchart shown in FIG. 2 only in that the steps S20A and S21A are used instead of the steps S20 and S21, and is otherwise identical.

In step S21A, instead of obtaining a value Cnox of the NOx concentration in the exhaust gas discharged from the engine by reading from a map for forced regeneration based on an engine speed Ne and a load Ac (on the basis of detected engine operational conditions, i.e., an engine speed Ne and a load (torque, fuel flow amount) Ac), a NOx concentration Cnoxa detected by the upstream NOx concentration sensor 33 is used.

Consequently, the following is achieved by the control method that follows the control flow in FIG. 5. During ordinary operation, a NOx emission amount Won is calculated from a NOx emission map for ordinary operation. An injection amount Qs of urea solution S corresponding to this calculated NOx emission amount Won is then calculated. A urea solution S is injected to bring the injected amount to the calculated injection amount Qs of urea solution S. During forced regeneration of the DPF device 13, upon receiving a control signal for forced regeneration of the DPF device 13 from the control device 30 of the engine 11, a NOx emission amount Won is calculated according to this signal using the NOx concentration Cnoxa measured by the upstream NOx concentration sensor 33 provided at the upstream side of the DPF device 13 and the exhaust gas flow amount (volume) Va. An injection amount Qs of urea solution S corresponding to the calculated NOx emission amount Won is then calculated. The urea solution S is then injected to bring the injected amount to the calculated injection amount Qs of urea solution S.

In so doing, although long-duration experiments become necessary for collecting needed data on PM deposits for the preparation of a NOx emission map for forced DPF regeneration, the preparation of the map itself becomes unnecessary. For this reason, the engine 11 can be adapted for this invention with the additional installation of a NOx concentration sensor and a partial modification of the control program, even for an engine 11 that is only provided with a NOx emission map for ordinary operation. Not only that, the NOx emission amount Won during forced DPF regeneration can be calculated more accurately.

Figure 6:
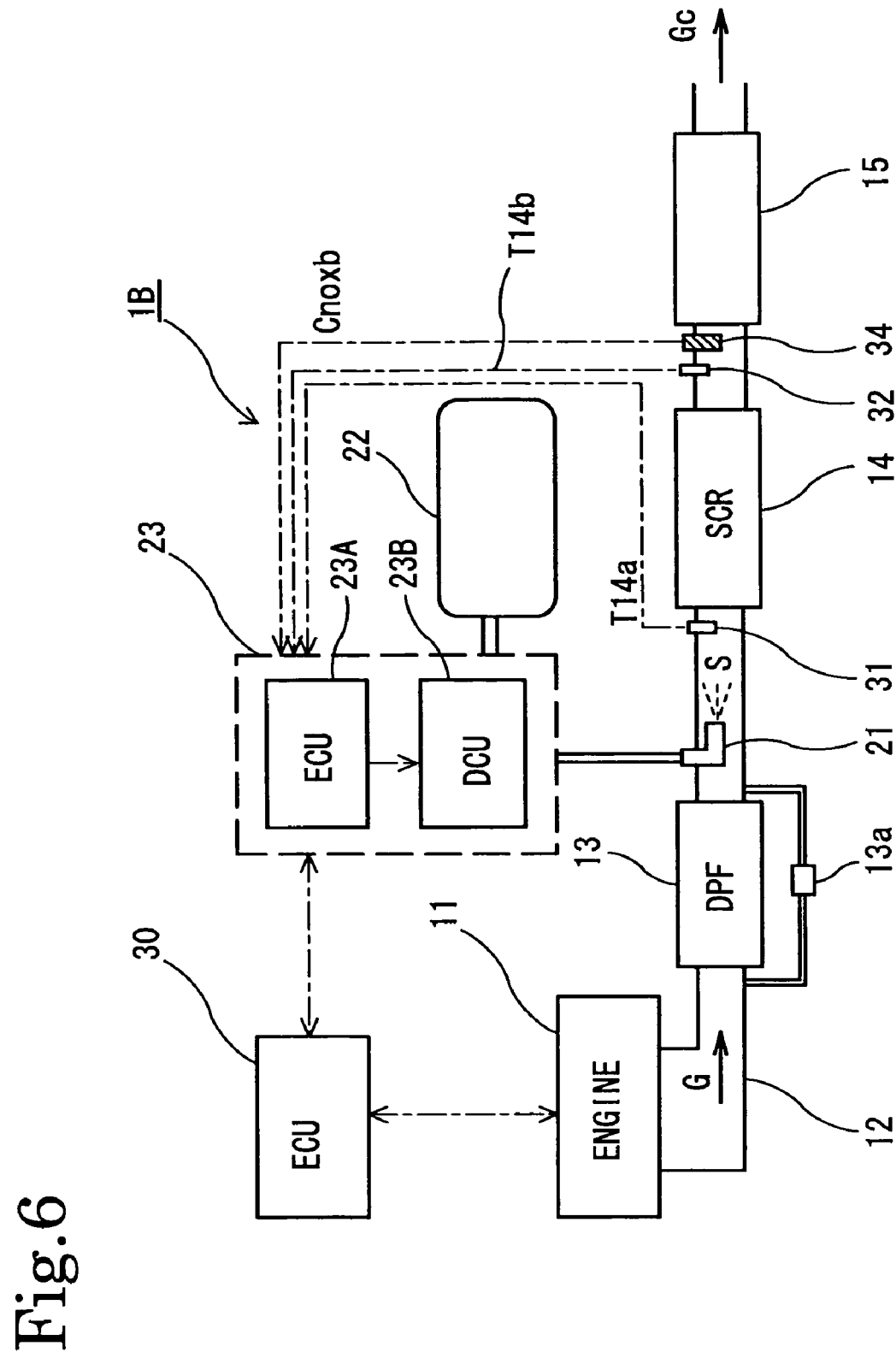
FIG. 6 is a system configuration diagram of the exhaust gas purification system in accordance with the third embodiment of the present invention.

The method for controlling an exhaust gas purification system in accordance with the third embodiment will now be described. FIG. 6 shows the configuration of an exhaust gas purification system 1B for carrying out this control method. This exhaust gas purification system 1B differs from the exhaust gas purification system 1 of the first embodiment in the following points: a downstream NOx concentration sensor 34 is installed in the exhaust passage 12 at the downstream side of the SCR catalytic device 14; the NOx concentration value Cnoxb detected by this downstream NOx concentration sensor 34 is input into the urea solution injection control unit 23; and a NOx emission map for forced DPF regeneration is not necessary. Other aspects of the system configuration are identical.

Figure 7:
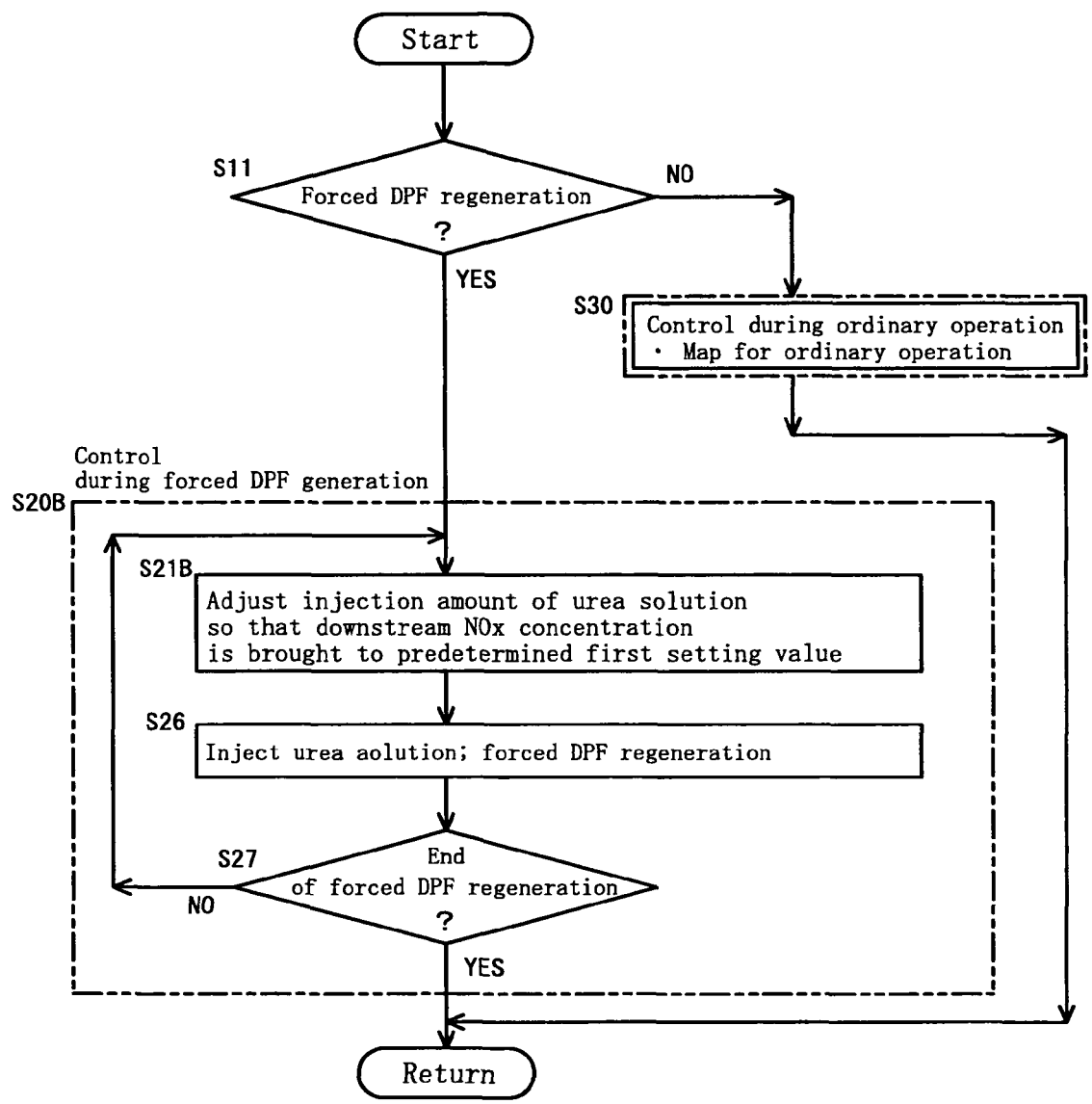
FIG. 7 is a control flowchart illustrating the method for controlling the exhaust gas purification system in accordance with the third embodiment of the present invention.

FIG. 7 is a control flowchart of this control method. This control flow differs from the control flowchart shown in FIG. 2 in that the steps S20B and S21B are used instead of the steps S20 and S21 to S25, and is otherwise identical.

In step S20B, the urea solution S is injected such that the NOx concentration Cnoxb measured in step S21B by the downstream NOx concentration sensor 34 provided at the downstream side of the SCR catalytic device 14 becomes equal to or less than a predetermined first setting value C1 (in FIG. 7, such that Cnoxb becomes equal to the predetermined first setting value C1).

Consequently, the following is achieved by the control method that follows the control flow in FIG. 7. During ordinary operation, a NOx emission amount Won is calculated from the NOx emission map for ordinary operation. An injection amount Qs of urea solution S corresponding to the calculated NOx emission amount Won is then calculated. The urea solution S is injected to bring the injected amount to the calculated injection amount Qs of urea solution S. During forced regeneration of the DPF device 13, upon receiving a control signal for forced regeneration of the DPF device 13 from the control device 30 of the engine 11, the urea solution S is injected according to this control signal such that the NOx concentration Cnoxb measured by the downstream NOx concentration sensor 34 provided at the downstream side of the SCR catalytic device 14 becomes equal to or less than the predetermined first setting value C1.

In so doing, although long-duration experiments are necessary for acquiring needed data on PM deposits for the preparation of a NOx emission map for forced DPF regeneration, the preparation of the map itself becomes unnecessary. For this reason, the engine 11 can be adapted for this invention with the additional installation of the NOx concentration sensor 34 and a partial modification of the control program, even for an engine 11 that is only provided with a NOx emission map for ordinary operation. Not only that, the amount of NOx outflowing to the downstream side of the SCR catalytic device 14 (i.e., NOx slip) during forced DPF regeneration can be more accurately suppressed.

Figure 8:
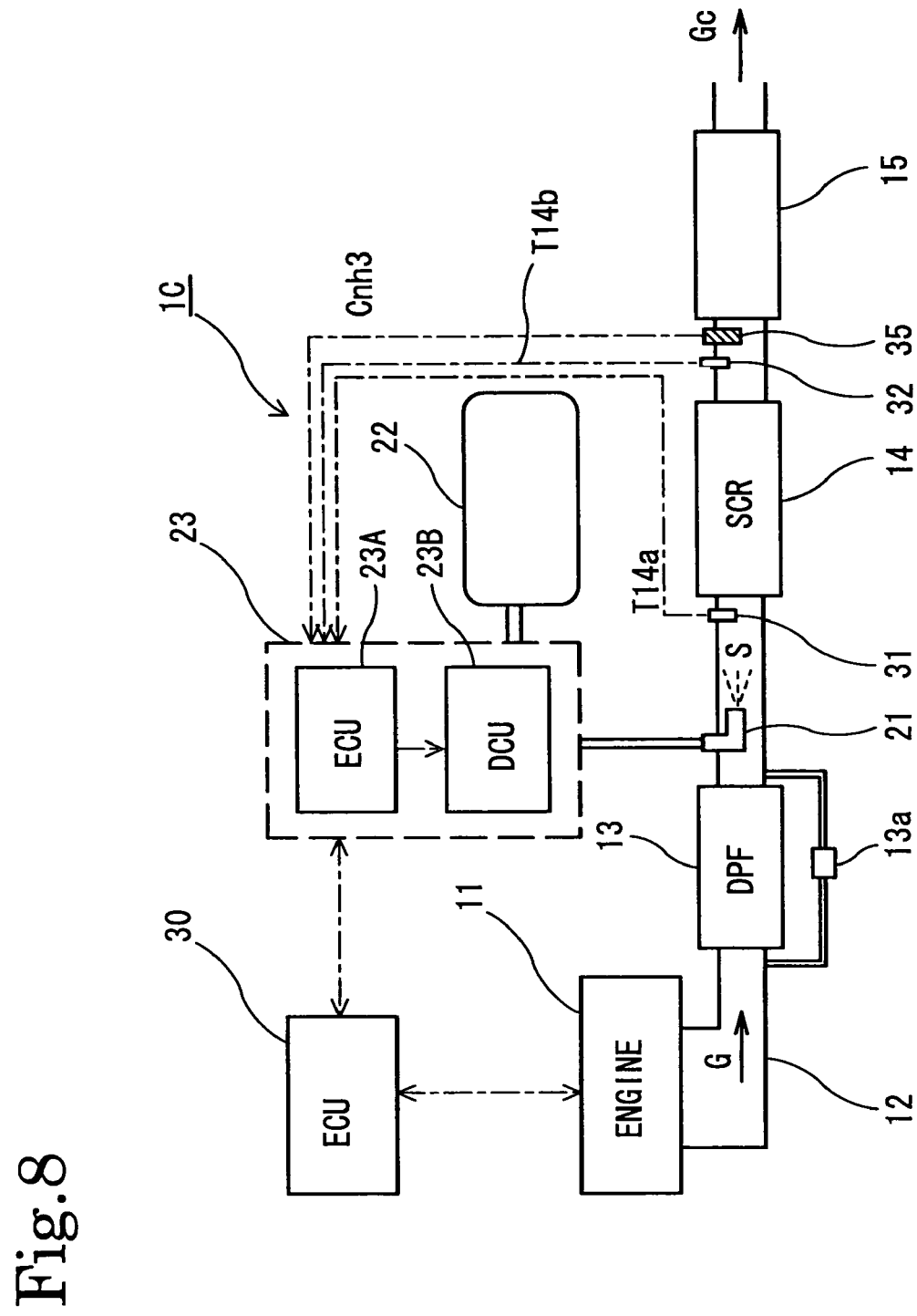
FIG. 8 is a system configuration diagram of the exhaust gas purification system in accordance with the fourth embodiment of the present invention.

The method for controlling an exhaust gas purification system in accordance with the fourth embodiment will now be described. FIG. 8 shows the configuration of an exhaust gas purification system 1C for carrying out this control method. This exhaust gas purification system 1C differs from the exhaust gas purification system 1 of the first embodiment in the following points: an ammonia concentration sensor 35 is installed in the exhaust passage 12 at the downstream side of the SCR catalytic device 14; an ammonia concentration value Cnh3 detected by this ammonia concentration sensor 35 is input into the urea solution injection control unit 23; and a NOx emission map for forced DPF regeneration is not necessary. Other aspects of the configuration are identical.

Figure 9:
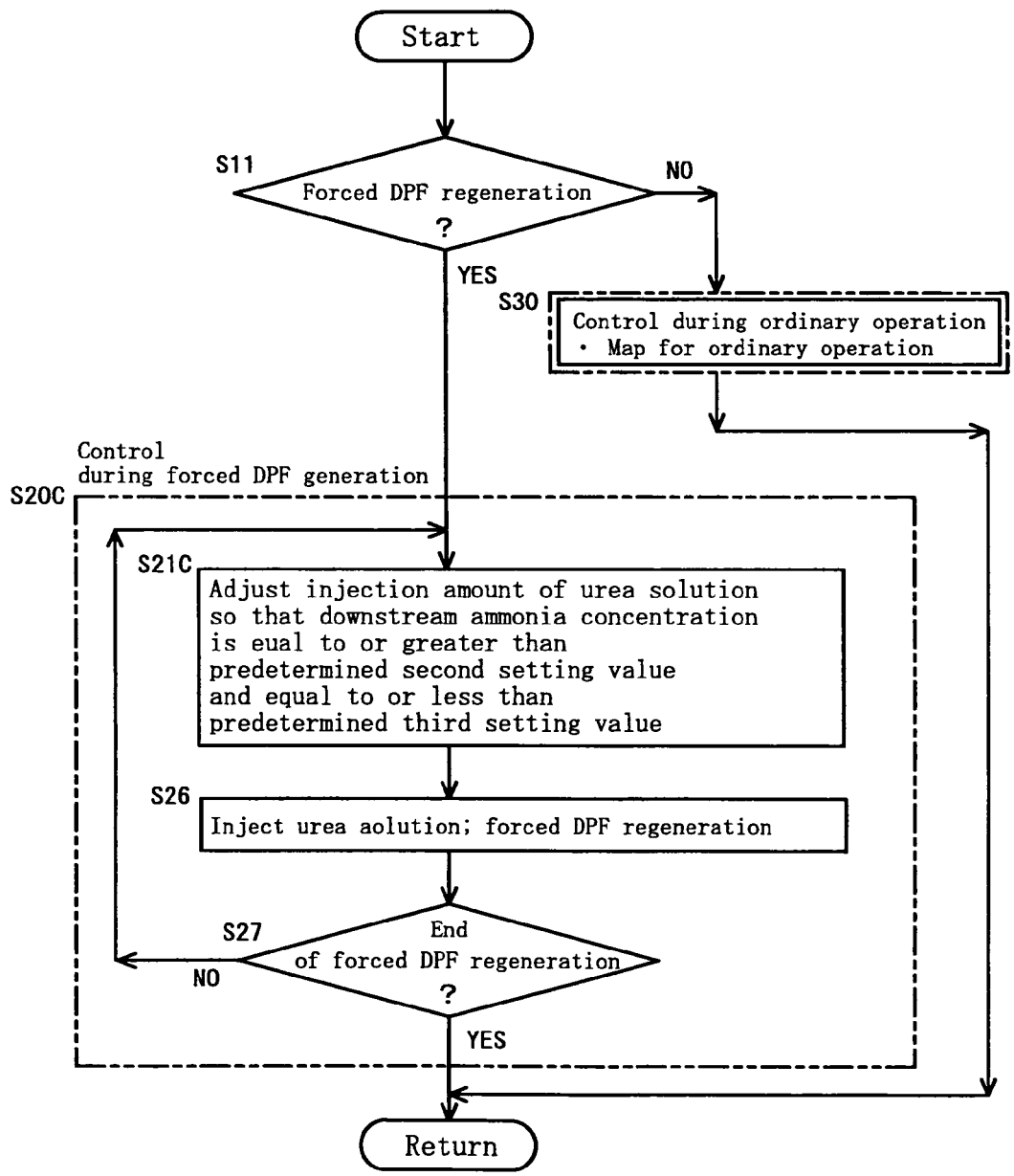
FIG. 9 is a control flowchart illustrating the method for controlling the exhaust gas purification system in accordance with the fourth embodiment of the present invention.

FIG. 9 is a control flowchart of the control method. This control flow differs from the control flowchart shown in FIG. 2 in that the steps S20C and S21C are used instead of the steps S20 and S21 to S25. The control flowchart is otherwise identical to that shown in FIG. 2.

In step S20C, the urea solution S is injected such that the ammonia concentration Cnh3 measured in step S21C by the ammonia concentration sensor 35 provided at the downstream side of the SCR catalytic device 14 becomes equal to or greater than a predetermined second setting value C2, and additionally equal to or less than a predetermined third setting value C3.

Consequently, the following is achieved by the control method that follows the control flow in FIG. 9. During ordinary operation, a NOx emission amount Won is calculated from a NOx emission map for ordinary operation. An injection amount Qs of urea solution S corresponding to the calculated NOx emission amount Won is then calculated. The urea solution S is injected to bring the injected amount to the calculated injection amount Qs of urea solution S. During forced regeneration of the DPF device 13, upon receiving a control signal for forced regeneration of the DPF device 13 from the control device 30 of the engine 11, urea solution S is injected according to this control signal such that the ammonia concentration Cnh3 measured by the ammonia concentration sensor 35 provided at the downstream side of the SCR catalytic device 14 becomes equal to or greater than a predetermined second setting value C2, and additionally equal to or less than a predetermined third setting value C3.

In so doing, although long-duration experiments are necessary for acquiring needed data on PM deposits for the preparation of a NOx emission map for forced DPF regeneration, the preparation of the map itself becomes unnecessary. For this reason, the engine 11 can be adapted for this invention with the additional installation of the ammonia concentration sensor 35 and a partial modification of the control program, even for an engine 11 that is only provided with a NOx emission map for ordinary operation. Not only that, amounts of the urea solution S sufficient for the reduction of NOx during forced DPF regeneration can be more accurately supplied.

As a result of the method for controlling an exhaust gas purification system in accordance with the above first through fourth embodiments, exhaust gas purification systems 1, 1A, 1B, and 1C are provided with a DPF device 13 and an SCR catalytic device 14 disposed, in that order, from the upstream side of the exhaust passage 12 of an engine 11. During forced regeneration of the DPF device 13, even if an amount of NOx, which is greater than during ordinary operation, is discharged an amount of urea solution S corresponding to the NOx amount can be injected, and thereby substantial NOx reduction performance can be secured. Consequently, decreases in the NOx removable performance of the selective catalytic reduction type catalytic device 14 during forced regeneration of the DPF device 13 can be suppressed.

In the above description, a filter-only DPF device without supporting a catalyst is described by way of example as the DPF device 13 in the exhaust gas purification system 1. However, it should be appreciated that the present invention is not limited thereto, and that it is possible to implement other types of DPFs, such as a continuous regeneration type DPF device supporting an oxidation catalyst on the filter, a continuous regeneration type DPF device provided with an oxidation catalyst at the upstream side of the filter, or a DPF device supporting a catalyst on the filter and provided with an oxidation catalyst at the upstream side of the filter.

INDUSTRIAL APPLICABILITY

Having the excellent advantages described above, the method for controlling an exhaust gas purification system of the present invention can be effectively utilized in exhaust gas purification systems or similar systems for purifying exhaust gas that have a DPF device and a selective catalytic reduction catalytic device (SCR catalytic device) provided, in that order, from the upstream side of an exhaust passage of an internal combustion engine mounted onboard an automobile.

What is claimed is:

1. A method for controlling an exhaust gas purification system, the system having a diesel particulate filter device for purifying particulate matter in an exhaust gas and a selective catalytic reduction type catalytic device for purifying NOx in the exhaust gas, these devices being disposed, in that order, from the upstream side in an exhaust passage of an internal combustion engine, the system furthermore having an aqueous solution supply device that supplies an aqueous ammonia solution to the selective catalytic reduction type catalytic device, being disposed at the downstream side of the diesel particulate filter device and additionally at the upstream side of the selective catalytic reduction type catalytic device, the system furthermore having aqueous solution supply amount adjusting means that adjusts the supply amount of the aqueous ammonia solution, wherein, the method comprising the steps of:

measuring in advance NOx emission amounts during ordinary operation and NOx emission amounts during forced regeneration of the diesel particulate filter device, and on the basis of the measured results, preparing a NOx emission map for ordinary operation and a NOx emission map for forced regeneration of the diesel particulate filter device;

during ordinary operation, calculating a NOx emission amount from the NOx emission map for ordinary operation, calculating a supply amount of aqueous ammonia solution necessary for reducing the calculated NOx emission amount, and supplying the aqueous ammonia solution to bring the supplied amount to the calculated supply amount; and during forced regeneration of the diesel particulate filter device, calculating a NOx emission amount from the NOx emission map for forced regeneration, calculating a supply amount of aqueous ammonia solution corresponding to the calculated NOx emission amount, and supplying the aqueous ammonia solution to bring the supplied amount to the calculated supply amount.

2. A method for controlling an exhaust gas purification system, the system having a diesel particulate filter device for purifying particulate matter in an exhaust gas and a selective catalytic reduction type catalytic device for purifying NOx in the exhaust gas, these devices being disposed, in that order, from the upstream side in an exhaust passage of an internal combustion engine, the system furthermore having an aqueous solution supply device that supplies an aqueous ammonia solution to the selective catalytic reduction type catalytic device, being disposed at the downstream side of the diesel particulate filter device and additionally at the upstream side of the selective catalytic reduction type catalytic device, the system furthermore having aqueous solution supply amount adjusting means that adjusts the supply amount of the aqueous ammonia solution, wherein, the method comprising the steps of:

measuring in advance NOx emission amounts during ordinary operation, and on the basis of the measured results, preparing a NOx emission map for ordinary operation;

during ordinary operation, calculating a NOx emission amount from the NOx emission map for ordinary operation, calculating a supply amount of aqueous ammonia solution corresponding to the calculated NOx emission amount, and supplying the aqueous ammonia solution to bring the supplied amount to the calculated supply amount; and during forced regeneration of the diesel particulate filter device, calculating the NOx emission amount using an exhaust gas emission amount and a NOx concentration measured by a NOx concentration sensor provided at the upstream side of the selective catalytic reduction catalytic device, calculating a supply amount of aqueous ammonia solution corresponding to the calculated NOx emission amount, and supplying the aqueous ammonia solution to bring the supplied amount to the calculated supply amount.

3. A method for controlling an exhaust gas purification system, the system having a diesel particulate filter device for purifying particulate matter in an exhaust gas and a selective catalytic reduction type catalytic device for purifying NOx in the exhaust gas, these devices being disposed, in that order, from the upstream side in an exhaust passage of an internal combustion engine, the system furthermore having an aqueous solution supply device that supplies an aqueous ammonia solution to the selective catalytic reduction type catalytic device, being disposed at the downstream side of the diesel particulate filter device and additionally at the upstream side of the selective catalytic reduction type catalytic device, the system furthermore having aqueous solution supply amount adjusting means that adjusts the supply amount of the aqueous ammonia solution, wherein, the method comprising the steps of:

measuring in advance NOx emission amounts during ordinary operation, and on the basis of the measured results, preparing a NOx emission map for ordinary operation;

during ordinary operation, calculating a NOx emission amount from the NOx emission map for ordinary operation, calculating a supply amount of aqueous ammonia solution corresponding to the calculated NOx emission amount, and supplying the aqueous ammonia solution to bring the supplied amount to the calculated supply amount; and during forced regeneration of the diesel particulate filter device, supplying the aqueous ammonia solution such that a NOx concentration value measured by a NOx concentration sensor provided at the downstream side of the selective catalytic reduction type catalytic device becomes equal to or less than a predetermined first setting value.

4. A method for controlling an exhaust gas purification system, the system having a diesel particulate filter device for purifying particulate matter in an exhaust gas and a selective catalytic reduction type catalytic device for purifying NOx in the exhaust gas, these devices being disposed, in that order, from the upstream side in an exhaust passage of an internal combustion engine, the system furthermore having an aqueous solution supply device that supplies an aqueous ammonia solution to the selective catalytic reduction type catalytic device, being disposed at the downstream side of the diesel particulate filter device and additionally at the upstream side of the selective catalytic reduction type catalytic device, the system furthermore having aqueous solution supply amount adjusting means that adjusts the supply amount of the aqueous ammonia solution, wherein, the method comprising the steps of:

measuring in advance NOx emission amounts during ordinary operation, and on the basis of the measured results, preparing a NOx emission map for ordinary operation;

during ordinary operation, calculating a NOx emission amount from the NOx emission map for ordinary operation, calculating a supply amount of aqueous ammonia solution corresponding to the calculated NOx emission amount, and supplying the aqueous ammonia solution to bring the supplied amount to the calculated supply amount; and during forced regeneration of the diesel particulate filter device, supplying the aqueous ammonia solution such that an ammonia concentration value measured by an ammonia concentration sensor provided at the downstream side of the selective catalytic reduction type catalytic device becomes equal to or greater than a predetermined second setting value and additionally equal to or less than a predetermined third setting value.

* * * * *